United States Patent Office  3,181,952
Patented May 4, 1965

3,181,952
ENHANCING THE AROMA OF FOODS
Sebastian V. R. Mastrangelo, Brandywine Hundred, Del., assignor to E. I. du Pont de Nemours and Company, Wilmington, Del., a corporation of Delaware
No Drawing. Filed May 25, 1961, Ser. No. 112,540
2 Claims. (Cl. 99—71)

This invention is related to a process for enhancing the aroma of instant foods. More particularly this process relates to a method of retaining the natural aroma of powdered, instant foods such as instant coffee.

There are on the market today a number of foods which are sold in powdered form and which are prepared for use by merely adding water to a powder. Examples of such are coffee, tea, orange juice, certain kinds of soup and the like. Most of these so-called "instant" foods are noted for a certain lack of natural taste or aroma when prepared for use.

It is a well known physiological fact that much of the taste of many feeds derives not only from ingredients detected by the taste buds on the tongue but also from odors of ingredients which are detected by the olfactory nerves of the nose. This is particularly true of the aromatic type or ester type of odor associated with coffee, tea, citrus fruit juices and certain herbs. For some unknown reason, powdered or "instant" foods, after preparation for use, often lack the aroma and taste usually associated with the same products prepared for use in the normal manner. Instant coffee is a good example. Generally people will agree that there is a very distinct difference in taste and aroma between instant coffee and coffee prepared in the normal manner from ground roasted coffee beans. The manufacturers are quite aware of this problem and have been searching for a suitable process for preserving the food aroma.

It is an object of this invention to provide a process for enhancing the aroma of powdered instant foods. A further object is to provide a process for enhancing the aroma of powdered or instant foods utilizing a fluorinated hydrocarbon as the aroma stabilizing agent. Other objects will appear hereinafter.

These and other objects are accomplished by contacting a saturated fluorinated hydrocarbon with a powdered "instant" food.

This process is for enhancing the aroma and flavor of powdered "instant" foods during use and the product obtained thereby which comprises contacting the powdered, instant food with a stable, non-toxic, tasteless water-insoluble saturated, perfluorinated hydrocarbon or chloropentafluoroethane all of which have a boiling point within the range of about —40° C. to about 50° C. at atmospheric pressure.

It is, of course, necessary that a material which is added to foods be non-toxic and not form toxic decomposition or reaction products even after long storage in food or on exposure to air or to hot water. For the present process the additive must have a boiling point within the range of —40° C. to 50° C. Materials falling outside these limits on either side do not operate as desired.

The materials which fit the above specification are, in general, saturated perfluoroalkanes and perfluorocycloalkanes and more particularly the following saturated fluorinated hydrocarbons: perfluoropropane (B.P. —39° C.), perfluorocyclopropane (B.P. —31.5° C.), perfluorocyclobutane (B.P. —6° C.), chloropentafluoroethane (B.P. —38.7° C.), perfluorobutane (B.P. 1° C.), and perfluoropentane (B.P. 30° C.). These compounds fit all of the above requirements provided they are highly purified and contain no contaminates which react with water, air, etc. Perfluorocyclobutane is the preferred material.

In a preferred embodiment of this invention the process is carried out by exposing the powdered food to an atmosphere of the fluorocarbon at some time before use. Most conveniently, this is done by the manufacturer as the final stage of preparation before packaging. A small amount of the perfluorocarbon vapor is contacted with the powdered, "instant" food and the vapor is retained by dissolving in or absorbing on or in the powder. It is not necessary to package the final product in a sealed container to retain the absorbed material. A container of, for example, instant coffee, opened for use by the consumer, retains the flavor and aroma enhancement throughout the use-life of the product.

The treated products are used in the normal manner, that is the powder is added to water or vice versa. Of course, the temperature of the water depends on the specific product being used. The enhanced aroma and flavor become apparent on addition of the water and are not necessarily noticeable beforehand. Series of tests were carried out using treated and untreated products of various types. Comparisons were made by groups of five to fifteen people who stated preferences without being aware of which were treated and untreated samples of the particular foodstuff. The vast majority of the people preferred the treated product in every case.

It should be understood that the present process is applicable with any benefit only to powdered, "instant" foods which are prepared by evaporation of a solution, suspension or the like of the original product to a dry powder. Natural products such as roasted coffee, normal tea prepared from tea leaves, cocoa, ordinary orange juice, ice cream, cheeses and the like are not materially benefited by the treatment. Of course, these food products have normal aroma and flavors of their own which may not need enhancement.

The following examples will better illustrate the nature of the present invention; however, the invention is not intended to be limited to these examples. Parts are by weight unless otherwise indicated.

*Example 1*

(a) Powdered, instant coffee is exposed to an atmosphere of perfluorocyclobutane at one atmosphere pressure and room temperature (25° C.) for about one minute.

The perfluorocyclobutane was specifically purified for use by the following method. A scrubbing apparatus, consisting of a glass column 2 inches in diameter by 6 feet in length and packed with ¼-inch ceramic Berl saddles, was assembled. Down through the column at room temperature flowed a solution of 50 parts piperidine and 50 parts pyridine which was kept circulated from a reservoir at the bottom of the column while unrefined octafluorocyclobutane gas entered the column at the base and passed up through the amine solution. From the top of the column, the amine-scrubbed gas was passed in turn through a scrubber containing 10% aqueous phosphoric acid, a silica gel dryer, and finally to a cold receiver. The feed rate of the gas through the system was maintained at 2.9 lbs. per hour and the perfluorocyclobutane was repassed for a second time through the column. The untreated octafluorocyclobutane was about 98% pure. It contained about 2% tetrafluoroethylene and hexafluoropropene, 0.075% octafluoroisobutylene, 0.15% other $C_4$ unsaturates, and about 0.3% saturated impurities. The much reduced concentrations of $C_3$ and $C_4$ unsaturated fluorocarbons present after treatment of the octafluorocyclobutane revealed by the colorimetric analysis indicated that less than 0.15 part per million of these contaminates were present.

(b) An alternate method consists in treating the instant coffee at 5–10° C. at atmospheric pressure for about two minutes. The powdered coffee was agitated during treatment to insure exposure of all of the material to the perfluorocyclobutane.

(c) The instant coffee prepared by method (a) above was added to hot water immediately. A group of tasters attested to its enhanced aroma and flavor. The instant coffee prepared by method (b) was stored in an ordinary jar before use. Again a group of tasters attested to its enhanced aroma and flavor over untreated instant coffee.

(d) Instant tea, soup, orange juice and the like are treated in the manner described in (a) above, giving products with exnhanced flavor and aroma when mixed with water.

As many widely different embodiments of this invention may be made without departing from the spirit and scope thereof, it is to be understood that this invention is not limited to the specific embodiments thereof except as defined in the appended claims.

The embodiments of this invention in which an exclusive property or privilege is claimed are defined as follows:

1. A process for enhancing the aroma of powdered instant food selected from the group consisting of coffee, tea, soups and citrus juices, which process comprises contacting said food in the dry phase at about one atmosphere pressure for at least one minute with the vapors of a stable, non-toxic, tasteless, water-insoluble saturated fluorinated hydrocarbon selected from the group consisting of perfluoropropane, perfluorocyclopropane, perfluorocyclobutane, chloropentafluoroethane, perfluorobutane and perfluoropentane.

2. A process for enhancing the aroma of powdered, instant foods selected from the group consisting of coffee, tea, soups and citrus juices which process comprises contacting said foods in the dry phase with vapors of perfluorocyclobutane at about one atmosphere pressure for at least one minute.

References Cited by the Examiner
UNITED STATES PATENTS

| | | | |
|---|---|---|---|
| 2,849,323 | 8/58 | Young | 99—60 X |
| 2,952,547 | 9/60 | Hill | 99—60 |
| 2,976,158 | 3/61 | Morgan et al. | 99—71 X |
| 2,977,231 | 3/61 | Fox et al. | 99—60 X |
| 2,980,582 | 4/61 | Keats | 99—189 X |
| 2,998,316 | 8/61 | Reich | 99—71 |

A. LOUIS MONACELL, *Primary Examiner.*

ABRAHAM H. WINKELSTEIN, *Examiner.*